US009112357B2

(12) United States Patent
Okuyama

(10) Patent No.: US 9,112,357 B2
(45) Date of Patent: Aug. 18, 2015

(54) MOBILE TERMINAL DEVICE, CHARGER, AND CHARGING SYSTEM

(75) Inventor: Toshiyuki Okuyama, Tokyo (JP)

(73) Assignee: LENOVO INNOVATIONS LIMITED (HONG KONG), Quarry Bay (HK)

( * ) Notice: Subject to any disclaimer, the term of this patent is extended or adjusted under 35 U.S.C. 154(b) by 505 days.

(21) Appl. No.: 13/498,517

(22) PCT Filed: Sep. 10, 2010

(86) PCT No.: PCT/JP2010/065599
§ 371 (c)(1),
(2), (4) Date: Mar. 27, 2012

(87) PCT Pub. No.: WO2011/040206
PCT Pub. Date: Apr. 7, 2011

(65) Prior Publication Data
US 2012/0181978 A1 Jul. 19, 2012

(30) Foreign Application Priority Data

Oct. 2, 2009 (JP) ................................ 2009-230323

(51) Int. Cl.
H02J 7/00 (2006.01)
(52) U.S. Cl.
CPC .................... *H02J 7/0004* (2013.01)
(58) Field of Classification Search
CPC ...... Y02E 60/12; H02J 7/0042; H02J 7/0045; H01M 10/46; H01M 10/44
USPC ........................................................ 320/107
See application file for complete search history.

(56) References Cited

U.S. PATENT DOCUMENTS

| 6,600,734 | B1 | 7/2003 | Gernert et al. | |
|---|---|---|---|---|
| 8,032,683 | B2 | 10/2011 | Habuto et al. | |
| 2005/0168235 | A1* | 8/2005 | Arai et al. | 324/765 |
| 2007/0096691 | A1* | 5/2007 | Duncan et al. | 320/114 |
| 2007/0260116 | A1* | 11/2007 | Shigemori et al. | 600/117 |
| 2009/0075629 | A1* | 3/2009 | Simpson et al. | 455/411 |

FOREIGN PATENT DOCUMENTS

| CN | 201112531 Y | 9/2008 |
|---|---|---|
| JP | H08-237345 A | 9/1996 |
| JP | 2000-183977 A | 6/2000 |

(Continued)

OTHER PUBLICATIONS

Office Action mailed Jun. 10, 2014 in related Japanese application No. 2011-534172 with partial English-language translation (4 pgs.).

Primary Examiner — Arun Williams

(57) ABSTRACT

A mobile terminal device (101) includes a charger identification information reception unit (103) that receives, from a charger (121) connected to charge a rechargeable battery (102), charger identification information to be used to identify the charger (121), a setting information storage unit (104) that stores setting information associated with the charger identification information, a setting information extraction unit (105) that extracts, from the setting information storage unit (104), the setting information corresponding to the charger identification information received by the charger identification information reception unit (103), and a setting unit (106) that setting, in the mobile terminal device (101), the setting information extracted by the setting information extraction unit (105).

8 Claims, 2 Drawing Sheets

(56) References Cited

FOREIGN PATENT DOCUMENTS

| | | |
|---|---|---|
| JP | 2002-261915 A | 9/2002 |
| JP | 2003169131 A | 6/2003 |
| JP | 2006-42552 A | 2/2006 |
| JP | 2006-42553 A | 2/2006 |
| JP | 2006-135874 A | 5/2006 |
| JP | 2006-279844 A | 10/2006 |
| JP | 2006-280119 A | 10/2006 |
| JP | 2006287832 A | 10/2006 |
| JP | 2007-79845 A | 3/2007 |
| JP | 2007-528186 A | 10/2007 |
| JP | 2008-306704 A | 12/2008 |

\* cited by examiner

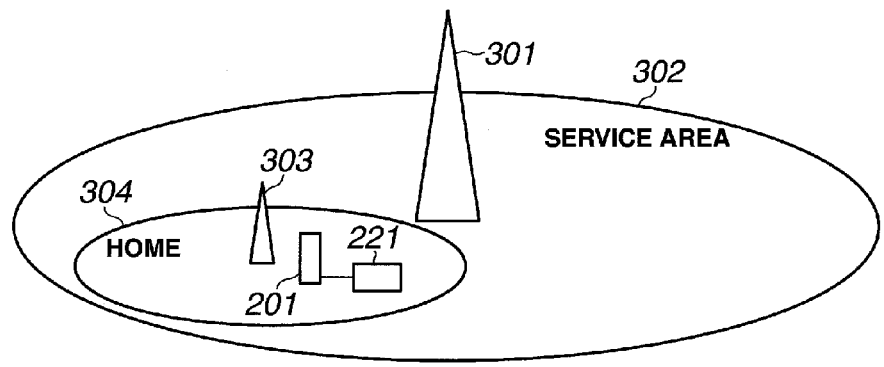
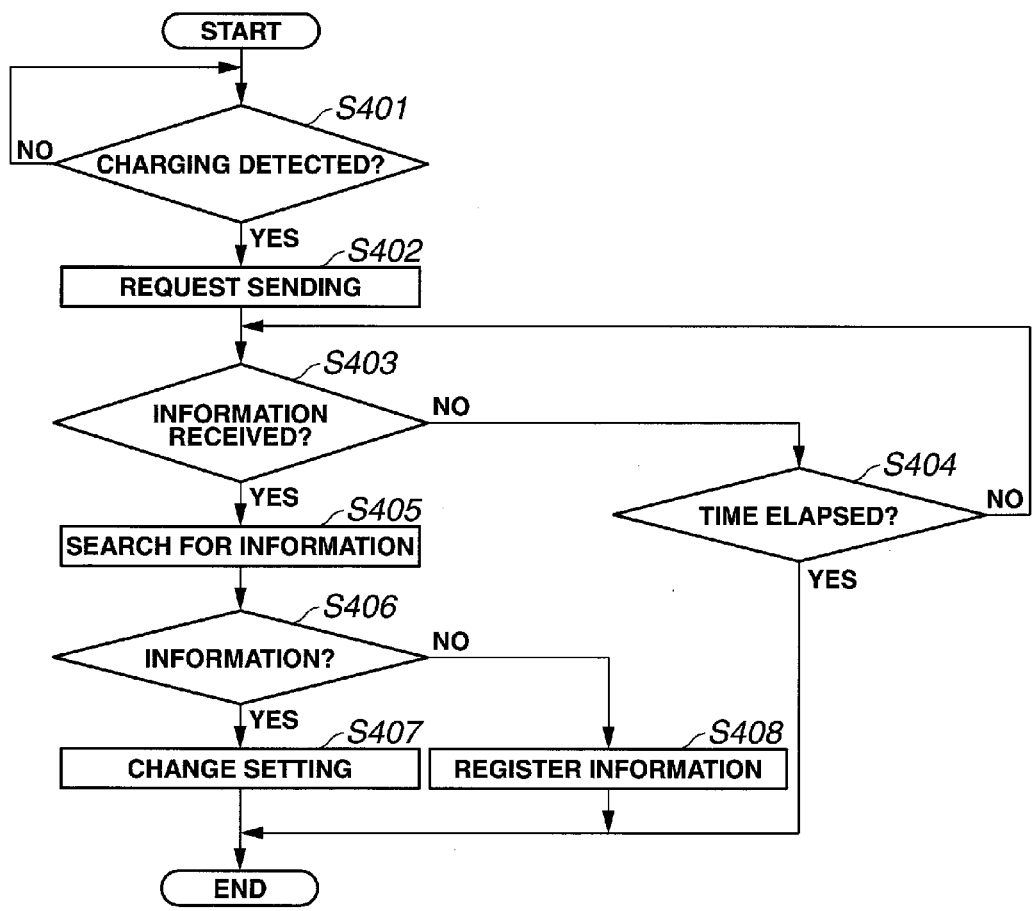

MOBILE TERMINAL DEVICE, CHARGER, AND CHARGING SYSTEM

This application is the National Phase of PCT/JP2010/065599, filed Sep. 10, 2010, which claims priority to Japanese Application No. 2009-230323, filed Oct. 2, 2010, the disclosures of which are hereby incorporated by reference in their entirety.

TECHNICAL FIELD

The present invention relates to a mobile terminal device that includes a rechargeable battery serving as a power supply and is connectable to a network, a charger that charges the rechargeable battery of the mobile terminal device, and a charging system.

BACKGROUND ART

Along with the recent size reduction of semiconductor devices, the functions imparted to mobile terminal devices are growing in number and performance. For example, there is used a cellular phone having a camera function, a word processor function, a recording function, a music playback function, a TV reception function, and the like (see patent literature 1). Also it is used a cellular phone having plural kinds of network connection functions corresponding to plural kinds networks. As the variety of functions increases, changes in the functions or setting changes in the network connection functions frequently occur depending on the use situation or use place (see patent literatures 2, 3, 4, and 5).

The function change or setting change is generally done by the user by determining the use situation. There also exists a technique of automatically loading stored setting information based on position information obtained from the GPS (Global Positioning System) and setting it in the cellular phone.

RELATED ART LITERATURE

Patent Literature

Patent Literature 1: Japanese Patent Laid-Open No. 2007-079845
Patent Literature 2: Japanese Patent Laid-Open No. 2000-183977
Patent Literature 3: Japanese Patent Laid-Open No. 2006-135874
Patent Literature 4: Japanese Patent Laid-Open No. 2007-528186
Patent Literature 5: Japanese Patent Laid-Open No. 2008-306704

DISCLOSURE OF INVENTION

Problem to be Solved by the Invention

However, the settings are wide-ranging in many cases. If, for example, the change frequency is high, it is troublesome for the user to do the settings. In addition, when the user changes the settings, he/she may forget the settings or changes and use the device in an inappropriate state. In the technique using position information of the GPS, for example, the obtained position information may be not sufficiently accurate relative to the size (extent) of the area where the network access connection function is changed. In the above-described use form or related technique, it is difficult to more properly change a function in accordance with a use situation.

The present invention has been made to solve the above-described problem, and has as its exemplary object to allow to more properly change a function of a mobile terminal device in accordance with a use situation.

Means of Solution to the Problem

According to an exemplary aspect of the invention, a mobile terminal device connectable to a network includes a rechargeable battery serving as a power supply of the mobile terminal device, charger identification information reception means for receiving, from a charger connected to charge the rechargeable battery, charger identification information to be used to identify the charger, setting information storage means for storing setting information associated with the charger identification information, setting information extraction means for extracting, from the setting information storage means, the setting information corresponding to the charger identification information received by the charger identification information reception means, and setting means for setting, in the mobile terminal device, the setting information extracted by the setting information extraction means.

According to another exemplary aspect of the invention, a charger for charging a rechargeable battery of a mobile terminal device that includes the rechargeable battery serving as a power supply and is connectable to a network includes charger identification information sending means for sending charger identification information to be used to identify the charger to the mobile terminal device.

According to still another exemplary aspect of the invention, a charging system includes a mobile terminal device connectable to a network, a rechargeable battery serving as a power supply of the mobile terminal device, and a charger for charging the rechargeable battery, the mobile terminal device including charger identification information reception means for receiving, from the charger connected to charge the rechargeable battery, charger identification information to be used to identify the charger, setting information storage means for storing setting information associated with the charger identification information, setting information extraction means for extracting, from the setting information storage means, the setting information corresponding to the charger identification information received by the charger identification information reception means, and setting means for setting, in the mobile terminal device, the setting information extracted by the setting information extraction means, and the charger including charger identification information sending means for sending the charger identification information to be used to identify the charger to the mobile terminal device.

Effect of the Invention

As described above, according to the present invention, charger identification information to be used to identify a charger is received from the charger. This produces an excellent effect of allowing to more properly change a function of a mobile terminal device in accordance with a use situation.

BRIEF DESCRIPTION OF DRAWINGS

FIG. 3 is a view showing an example of the arrangement of a charging system including the mobile terminal device and the charger according to the second exemplary embodiment of the present invention; and FIG. 4 is a flowchart for explaining an example of the charging operation of the mobile terminal device and the charger according to the second exemplary embodiment of the present invention.

BEST MODE FOR CARRYING OUT THE INVENTION

The exemplary embodiments of the present invention will now be described with reference to the accompanying drawings.

First Exemplary Embodiment

Figure 1:
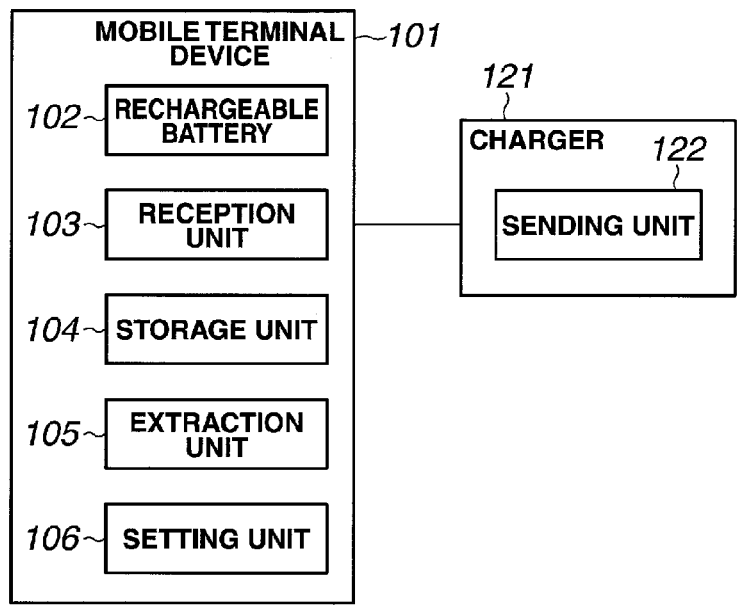
FIG. 1 is a block diagram showing the arrangement of a mobile terminal device and a charger according to the first exemplary embodiment of the present invention.

The first exemplary embodiment of the present invention will be described first with reference to FIG. 1. FIG. 1 is a block diagram showing the arrangement of a mobile terminal device 101 and a charger 121 according to the first exemplary embodiment of the present invention.

The mobile terminal device 101 is, for example, a general cellular phone that is currently commercially available, and includes a rechargeable battery 102 formed from a secondary battery such as a well-known lithium ion battery. Although not illustrated, the mobile terminal device 101 also includes an antenna, a transmitting/receiving unit, a main control unit, an operation unit, a storage unit, and a display unit, and is connectable to various kinds of networks.

The mobile terminal device 101 also includes a charger identification information reception unit 103 that receives charger identification information to be used to identify the charger 121 from the charger 121 connected to charge the rechargeable battery 102. The mobile terminal device 101 also includes a setting information storage unit 104 that stores setting information associated with the charger identification information. The mobile terminal device 101 also includes a setting information extraction unit 105 that extracts, from the setting information storage unit 104, the setting information corresponding to the charger identification information received by the charger identification information reception unit 103. The mobile terminal device 101 also includes a setting unit 106 that sets, in the mobile terminal device 101, the setting information extracted by the setting information extraction unit 105.

On the other hand, the charger 121 includes a charger identification information sending unit 122 that sends the charger identification information to be used to identify the charger 121 to the mobile terminal device 101. The charger identification information is stored in a storage unit provided in the charger identification information sending unit 122. The charger identification information may be stored in another storage unit (not shown) and extracted and sent by the charger identification information sending unit 122.

When the mobile terminal device 101 is connected to the charger 121 to charge the rechargeable battery 102, the charger identification information sending unit 122 sends the charger identification information to the mobile terminal device 101. The sent charger identification information is received by the charger identification information reception unit 103. When the charger identification information reception unit 103 receives the charger identification information, the setting information extraction unit 105 extracts, from the setting information storage unit 104, setting information corresponding to the received charger identification information. When the setting information is thus extracted, the setting unit 106 sets the extracted setting information in the mobile terminal device 101.

As described above, in this exemplary embodiment, setting information corresponding to charger identification information sent from the charger 121 is set in the mobile terminal device 101. Hence, according to this exemplary embodiment, constructing setting information in accordance with the use situation in the place where the charger 121 is provided makes it possible to more properly change a function in accordance with the use situation.

For example, consider a case in which the mobile terminal device is wirelessly connected outdoors to a base station operated by the carrier in use, whereas the device is connected to a femtocell and then to a network at home. In this case, when charged by the charger 121 arranged at home, the mobile terminal device receives the charger identification information from the charger 121 so that setting information to connect the femtocell can be set in the mobile terminal device 101. In this case, the setting information to connect the femtocell is stored in the setting information storage unit 104 in correspondence with the charger identification information.

In the area where the charger 121 is arranged, the cellular phone may need to be set in the silent mode. In this case, the mobile terminal device receives the charger identification information from the charger 121 so that setting information to set the silent mode can be set in the mobile terminal device 101. In this case, the setting information to set the silent mode is stored in the setting information storage unit 104 in correspondence with the charger identification information. In the area where the charger 121 is arranged, the use of the camera function, the word processor function, the recording function, the music playback function, the TV reception function, and the like of the mobile terminal device 101 may be restricted. In this case, the mobile terminal device receives the charger identification information from the charger 121 so that function restriction setting information to restrict the functions can be set in the mobile terminal device 101.

In the above-described exemplary embodiment, the charger identification information is provided for an individual charger so as to enable identification (discrimination) of each charger. However, the present invention is not limited to this. The charger identification information need only allow to identify, for example, the area where the charger is arranged. Single charger identification information may commonly be provided for a plurality of chargers arranged in the area where a function as described above is to be set.

Second Exemplary Embodiment

Figure 2:
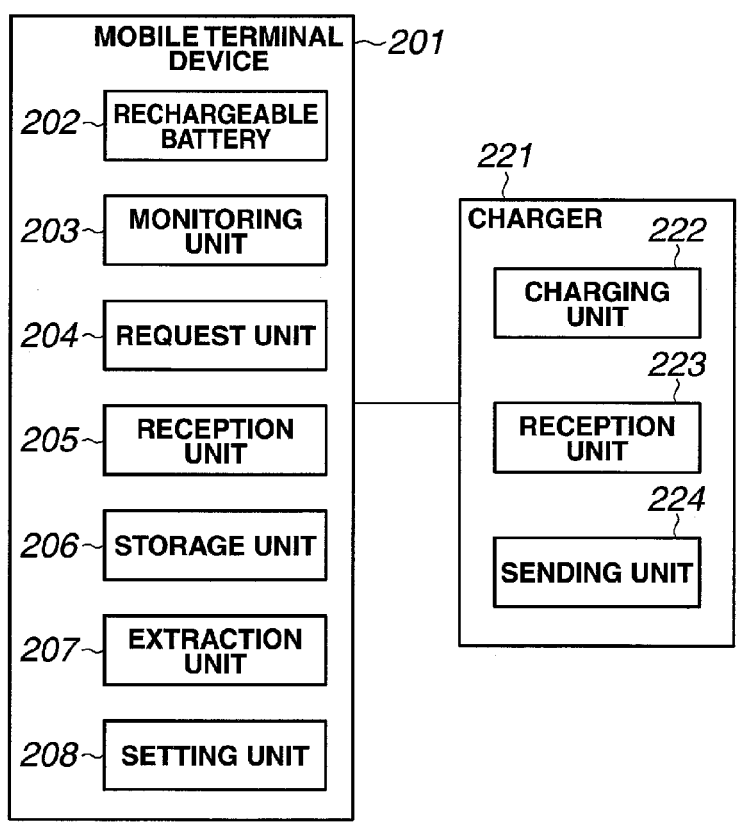
FIG. 2 is a block diagram showing the arrangement of a mobile terminal device and a charger according to the second exemplary embodiment of the present invention.

The second exemplary embodiment of the present invention will be described next with reference to FIGS. 2, 3, and 4. FIG. 2 is a block diagram showing the arrangement of a mobile terminal device 201 and a charger 221 according to the second exemplary embodiment of the present invention.

The mobile terminal device 201 is, for example, a general cellular phone that is currently commercially available, and includes a rechargeable battery 202 formed from a secondary battery such as a well-known lithium ion battery. Although not illustrated, the mobile terminal device 201 also includes an antenna, a transmitting/receiving unit, a main control unit, an operation unit, a storage unit, and a display unit, and is connectable to various kinds of networks.

The mobile terminal device 201 also includes a charging monitoring unit 203 that detects supply of charging power (applying a charging voltage) supplied from the charger 221 connected to charge the rechargeable battery 202. The mobile terminal device 201 also includes a charger identification information request unit 204 that requests the charger 221 to send charger identification information to be used to identify the charger 221 when the charging monitoring unit 203 detects applying the charging voltage. The mobile terminal device 201 also includes a charger identification information reception unit 205 that receives the charger identification information from the charger 221 after the charger identification information request unit 204 has sent the request. The mobile terminal device 201 also includes a setting information storage unit 206 that stores setting information associated with the charger identification information. The mobile terminal device 201 also includes a setting information extraction unit 207 that extracts, from the setting information storage unit 206, the setting information corresponding to the charger identification information received by the charger identification information reception unit 205. The mobile terminal device 201 also includes a setting unit 208 that sets, in the mobile terminal device 201, the setting information extracted by the setting information extraction unit 207.

On the other hand, the charger 221 includes a charging unit 222 that supplies charging power to the mobile terminal device 201. The charger 221 also includes a charger identification information request reception unit 223 that receives the charger identification information sending request from the mobile terminal device 201. The charger 221 also includes a charger identification information sending unit 224 that sends the requested charger identification information to the mobile terminal device 201 when the charger identification information request reception unit 223 has received the sending request.

In this exemplary embodiment, as shown in FIG. 3, in an outdoor service area 302 of a base station 301 operated by the carrier, the mobile terminal device 201 is connected to a network via the base station 301. At home, however, in a home service area 304 of a femtocell 303, the mobile terminal device 201 can be connected to a network via the femtocell 303. In this exemplary embodiment, when the mobile terminal device 201 is connected to the charger 221 to perform charging at home, setting information for network connection via the femtocell 303 is set in the mobile terminal device 201.

For example, assume that the setting information for network connection via the femtocell 303 is not stored in the setting information storage unit 206 in correspondence with the charger identification information to be used to identify the charger 221. In this state, the user performs the operation of doing the settings for network connection via the femtocell 303 in the mobile terminal device 201 at home. In the state in which the settings have thus been changed, the mobile terminal device 201 is connected to the charger 221 to perform charging. Then, the charger identification information sending unit 224 sends the charger identification information in response to the request from the charger identification information request unit 204, and the charger identification information reception unit 205 receives the charger identification information.

Upon receiving the charger identification information, the setting information extraction unit 207 searches the setting information storage unit 206 for the setting information corresponding to the charger identification information. Since the setting information associated with the charger identification information is not stored in the setting information storage unit 206, as described above, the setting information extraction unit 207 determines that the setting information corresponding to the charger identification information does not exist. When the determination is done, the setting unit 208 stores the setting information for network connection via the femtocell 303, which is currently set in the mobile terminal device 201 as described above, in the setting information storage unit 206 in correspondence with the received charger identification information.

The setting information storage unit 206 thus stores the setting information for network connection via the femtocell 303, which is associated with the charger identification information. From then on, when charging is performed by connecting the charger 221, the setting information for network connection via the femtocell 303 is set in the mobile terminal device 201.

The operation of the charging system including the mobile terminal device 201 and the charger 221 according to this exemplary embodiment will be explained below with reference to the flowchart of FIG. 4.

When the charging monitoring unit 203 detects applying the charging voltage supplied from the charger 221 in step S401, the charger identification information request unit 204 requests the charger 221 to send charger identification information to be used to identify the charger 221 in step S402. After that, the charger identification information reception unit 205 waits for reception of the charger identification information sent from the charger 221 (charger identification information sending unit 224) for a set time (steps S403 and S404).

When the charger identification information reception unit 205 receives the charger identification information (Y in step S403), the setting information extraction unit 207 searches the setting information storage unit 206 for the setting information corresponding to the received charger identification information. If the setting information corresponding to the charger identification information is found by this search (Y in step S406), the setting unit 208 sets the extracted setting information in the mobile terminal device 201 to change its settings (step S407).

On the other hand, if the setting information corresponding to the charger identification information is not stored in the setting information storage unit 206 (N in step S406), the setting unit 208 stores the set state of the mobile terminal device 201 at the point of time the charger identification information has been received in the setting information storage unit 206 in association with the received charger identification information. Note that if the set time has elapsed in the time elapse determination of step S404, the operation ends without performing the above-described processing from step S405.

In the above-described exemplary embodiment, the setting information corresponding to the charger identification information sent from the charger 221 is set in the mobile terminal device 201. As a result, according to this exemplary embodiment, constructing setting information in accordance with the use situation in the place where the charger 221 is provided makes it possible to more properly change a function in accordance with the use situation. In addition, since the setting information can include the settings of the variety of functions of the mobile terminal device, complex settings for a combination of the functions can easily be changed.

Note that the present invention is not limited to the above-described exemplary embodiments, and many modifications and combinations can occur to those who have normal knowledge in this field without departing from the technical scope of the present invention. For example, the mobile terminal device may have network access functions for wireless LAN, WiMAX, and the like, and the settings of these functions may be stored as setting information. The address information of a connection destination access point, a server, or the like may be stored as setting information. A combination of a plurality of pieces of charger identification information and setting information may be stored. A desired combination of charger identification information and setting information may be erasable by the user operation.

The charging unit and the charger identification information sending unit may be combined as separate devices. For example, the charger identification information sending unit may separately be mounted on a charging stand including the charging unit. The charger identification information may be sent using a dedicated signal line different from the power line for the supplied charging. The charger identification information may be superimposed on the charging power (voltage signal supplied from the charger for charging). Alternatively, the charger identification information may be sent using a wireless medium such as NFC (Near Field Communication).

Some or all of the above-described exemplary embodiments can also be described as in the following supplementary notes but are not limited to the followings.

(Supplementary Note 1)

A mobile terminal device connectable to a network comprises a rechargeable battery serving as a power supply of the mobile terminal device, charger identification information reception means for receiving, from a charger connected to charge the rechargeable battery, charger identification information to be used to identify the charger, setting information storage means for storing setting information associated with the charger identification information, setting information extraction means for extracting, from the setting information storage means, the setting information corresponding to the charger identification information received by the charger identification information reception means, and setting means for setting, in the mobile terminal device, the setting information extracted by the setting information extraction means.

(Supplementary Note 2)

In a mobile terminal device according to supplementary note 1, the setting information is selected from connection setting information for connection to the network and function restriction setting information that restricts a function of the mobile terminal device.

(Supplementary Note 3)

In a mobile terminal device according to supplementary note 1, the charger identification information is superimposed on a voltage signal supplied from the charger for charging.

(Supplementary Note 4)

In a mobile terminal device according to supplementary note 1, the charger identification information is received via a signal line different from a power line for charging supplied from the charger.

(Supplementary Note 5)

In a mobile terminal device according to supplementary note 1, the charger identification information is received from the charger via a wireless medium.

(Supplementary Note 6)

A charger for charging a rechargeable battery of a mobile terminal device that includes the rechargeable battery serving as a power supply and is connectable to a network comprises charger identification information sending means for sending charger identification information to be used to identify the charger to the mobile terminal device.

(Supplementary Note 7)

A charging system comprises a mobile terminal device connectable to a network, a rechargeable battery serving as a power supply of the mobile terminal device, and a charger for charging the rechargeable battery, the mobile terminal device comprising charger identification information reception means for receiving, from the charger connected to charge the rechargeable battery, charger identification information to be used to identify the charger, setting information storage means for storing setting information associated with the charger identification information, setting information extraction means for extracting, from the setting information storage means, the setting information corresponding to the charger identification information received by the charger identification information reception means, and setting means for setting, in the mobile terminal device, the setting information extracted by the setting information extraction means, and the charger comprising charger identification information sending means for sending the charger identification information to be used to identify the charger to the mobile terminal device.

The present invention has been described above with reference to the exemplary embodiments. However, the present invention is not limited to the above exemplary embodiments. Various changes and modifications understandable by those who skilled in the art can be done for the arrangements and details of the present invention without departing the scope of the present invention.

This application is based upon and claims the benefit of priority from Japanese patent application No. 2009-230323, filed on Oct. 2, 2009, the disclosure of which is incorporated herein in its entirety by reference.

EXPLANATION OF THE REFERENCE NUMERALS AND SIGNS

101 . . . mobile terminal device, 102 . . . rechargeable battery, 103 . . . charger identification information reception unit, 104 . . . setting information storage unit, 105 . . . setting information extraction unit, 106 . . . setting unit, 121 . . . charger, 122 . . . charger identification information sending unit

The invention claimed is:

1. A mobile terminal device connectable to a network, comprising:
   a rechargeable battery serving as a power supply of the mobile terminal device;
   a charger identification information reception unit configured to receive, from a charger connected to charge said rechargeable battery, charger identification information to be used to identify the charger;
   a selling information storage unit configured to store setting information associated with the charger identification information;
   a setting information extraction unit configured to extract, from said setting information storage unit, the setting information corresponding to the charger identification information received by said charger identification information reception unit; and
   a setting unit configured to set, in the mobile terminal device, the setting information extracted by said setting information extraction unit and store the setting information storage unit, setting information that is set in said mobile terminal device when charger identification information is accepted when setting information corresponding to the charger identification information received by said charger identification information reception unit is not stored in said setting information storage unit, by associating the setting information set in the mobile terminal device with the charger identification information.

2. A mobile terminal device according to claim 1, wherein the setting information is selected from connection setting information for connection to the network and function restriction setting information that restricts a function of the mobile terminal device.

3. A mobile terminal device according to claim 1, wherein the charger identification information is superimposed on a voltage signal supplied from the charger for charging.

4. A mobile terminal device according to claim 1, wherein the charger identification information is received via a signal line different from a power line for charging supplied from the charger.

5. A mobile terminal device according to claim 1, wherein the charger identification information is received from the charger via a wireless medium.

6. A charging system comprising:
a mobile terminal device connectable to a network;
a rechargeable battery serving as a power supply of said mobile terminal device; and
a charger for charging the rechargeable battery,
said mobile terminal device comprising:
a charger identification information reception unit configured to receive, from said charger connected to charge said rechargeable battery, charger identification information to be used to identify said charger;
a setting information storage unit configured to store setting information associated with the charger identification information;
a setting information extraction unit configured to extract, from said setting information storage unit, the setting information corresponding to the charger identification information received by said charger identification information reception unit; and
a setting unit configured to set, in said mobile terminal device, the setting information extracted by said setting information extraction unit and store, in the setting information storage unit, setting information that is set in said mobile terminal device when charger identification information is accepted when setting information corresponding to the charger identification information received by said charger identification information reception unit is not stored in said setting information storage unit, by associating the setting information set in the mobile terminal device with the charger identification information, and
said charger comprising:
a charger identification information sending unit configured to send the charger identification information to be used to identify said charger to said mobile terminal device.

7. A mobile terminal device connectable to a network, comprising:
a rechargeable battery serving as a power supply of the mobile terminal device;
charger identification information reception means for receiving, from a charger connected to charge said rechargeable battery, charger identification information to be used to identify the charger;
setting information storage means for storing setting information associated with the charger identification information;
setting information extraction means for extracting, from said setting information storage means, the setting information corresponding to the charger identification information received by said charger identification information reception means; and
setting means for setting, in the mobile terminal device, the setting information extracted by said setting information extraction means and for storing, in the setting information storage unit, setting information that is set in said mobile terminal device when charger identification information is accepted when setting information corresponding to the charger identification information received by said charger identification information reception unit is not stored in said setting information storage unit, by associating the setting information set in the mobile terminal device with the charger identification information.

8. A charging system comprising:
a mobile terminal device connectable to a network;
a rechargeable battery serving as a power supply of said mobile terminal device; and
a charger for charging the rechargeable battery,
said mobile terminal device comprising:
charger identification information reception means for receiving, from said charger connected to charge said rechargeable battery, charger identification information to be used to identify said charger;
setting information storage means for storing setting information associated with the charger identification information;
setting information extraction means for extracting, from said setting information storage means, the setting information corresponding to the charger identification information received by said charger identification information reception means; and
setting means for setting, in said mobile terminal device, the setting information extracted by said setting information extraction means and for storing, in the setting information storage unit, setting information that is set in said mobile terminal device when charger identification information is accepted when setting information corresponding to the charger identification information received by said charger identification information reception unit is not stored in said setting information storage unit by associating the setting information set in the mobile terminal device with the charger identification information, and
said charger comprising:
charger identification information sending means for sending the charger identification information to be used to identify said charger to said mobile terminal device.

* * * * *